Patented Feb. 26, 1946

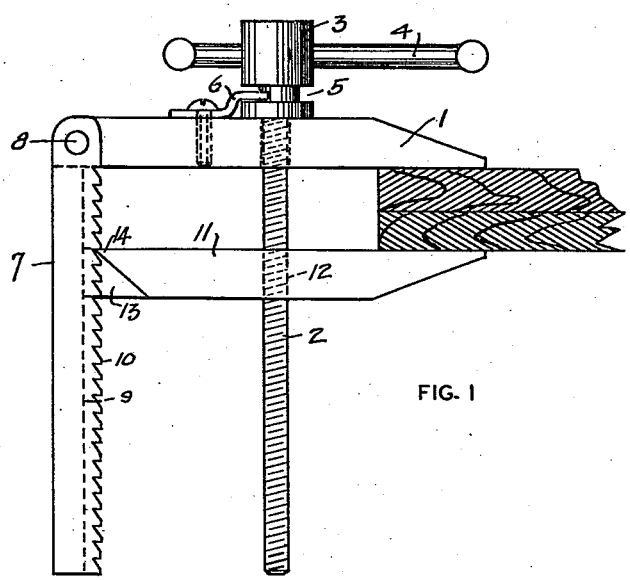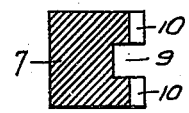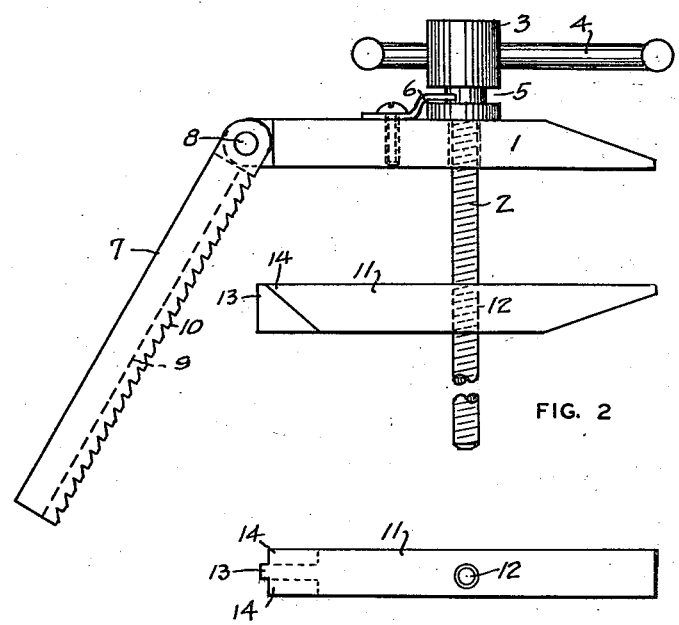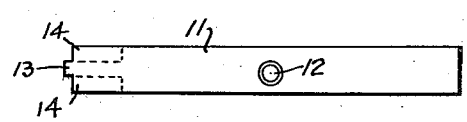

2,395,607

UNITED STATES PATENT OFFICE 2,395,607

CLAMP

Peder M. Aalberg, Tacoma, Wash.

Application December 26, 1944, Serial No. 569,853

2 Claims. (Cl. 144—297)

This invention relates to clamps for use in carpenter shops and other places where it is desired to temporarily clamp pieces of wood or other material together.

The objects of my invention are to produce a clamp of extreme simplicity with only one screw and which may be adjusted rapidly and applied to the work quickly, and which effectively clamps the pieces of work together. Another object is to provide a clamp which is cheap to make, easy to apply and effective in use.

I attain these and other objects by the devices, mechanisms and arrangements illustrated in the accompanying drawing, in which—

Fig. 1 is a side elevation of my improved clamp in use; Fig. 2 is a similar view showing the clamp being adjusted; Fig. 3 is a cross-section of the rack bar, drawn on a larger scale; and Fig. 4 is a plan view of the lower clamping jaw.

Similar numerals of reference refer to similar parts throughout the several views.

This clamp is intended to take the place of the common two-screw wooden clamp universally used in these shops. The clamp comprises an upper jaw 1, through which the clamping screw 2 freely passes. The screw 2 has a head 3 positioned above the jaw 1. An operating lever 4 passes through the head 3 whereby pressure may be applied to the screw to tighten the clamp. The head 3 is provided with a groove 5 extending around it. A keeper 6 is secured to the top of the jaw 1 and engages the groove 5 to hold the screw 2 in the jaw 1.

A rack bar 7 is pivotally attached at 8 to the jaw 1, and is provided with a central longitudinal groove 9 extending on its inner side from the pivot 8. A series of rack teeth 10 are made on the said inner side of the bar 7 on each side of the groove 9 (Fig. 3).

The lower clamping jaw 11 is shaped similarly to the upper jaw 1, and is provided with a screw threaded hole 12 through which the above screw 2 passes. Each side of the rear end of the clamping jaw 11 is cut away on a beveled line to provide a tongue 13 adapted to fit in the groove 9 of the rack bar 7, and to form teeth 14 with its upper angled shoulders, said teeth being adapted to engage the rack teeth 10.

As seen in Fig. 2 this clamp may be very quickly adjusted by merely swinging the rack bar 7 out from its normal position so as to release the teeth 14, of the lower clamp jaw 11, from the rack teeth 10 and then spinning the said clamp jaw 11 up or down on the screw 2 until the space between it and the upper jaw 1 is the desired distance for clamping the work. The rack bar 7 is then returned to its normal position, the tongue 13 engaging the groove 9 and the teeth 14 engaging the teeth 10. The screw 2 may then be turned to tighten the clamp. The clamping action between the open ends of the two jaws 1 and 11 is attained by the screw 2 pulling up on the jaw 11 and the teeth 14 pushing upward on the rack teeth 10, resulting in a very strong clamping action.

Having described my invention, what I claim and desire to secure by Letters Patent is:

1. In a clamp, the combination of an upper jaw; a rack bar pivoted thereto, and having rack teeth formed thereon; a groove extending along said rack bar and cutting the rack teeth into two parallel series; a screw passing freely through said upper jaw; a clamping jaw threadedly engaged intermediate its ends by said screw and adapted to engage with one of its ends the rack of said rack bar; and a tongue formed on said one end of said clamping jaw and adapted to engage the said groove in said rack bar, whereby said clamping jaw is held in position relatively to said upper jaw.

2. A clamp comprising an upper jaw; a toothed rack bar pivoted to one end thereof; a screw passing freely through said upper jaw; and a clamping jaw rotatably mounted on the threads of said screw and adapted to engage with one end the teeth of said rack bar when said bar is in normal position, but free therefrom when said bar is swung out on its pivot away from its normal position so as to permit said jaw to be rotated on said screw for quick adjustment in relation to said upper jaw, whereby said clamp may be tightened by the rotation of said screw in said jaws when the clamping jaw is in engagement with the rack teeth.

PEDER M. AALBERG.